United States Patent
Heidarpour et al.

(10) Patent No.: US 12,164,892 B2
(45) Date of Patent: Dec. 10, 2024

(54) METHODS AND DEVICES FOR COMPILER FUNCTION FUSION

(71) Applicant: HUAWEI TECHNOLOGIES CO., LTD., Shenzhen (CN)

(72) Inventors: Mehrnoosh Heidarpour, Richmond Hill (CA); Henry Fangli Kao, Calgary (CA); Ehsan Amiri, Thornhill (CA); Congzhe Cao, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 107 days.

(21) Appl. No.: 17/674,903

(22) Filed: Feb. 18, 2022

(65) Prior Publication Data
US 2023/0266950 A1   Aug. 24, 2023

(51) Int. Cl.
*G06F 8/41*   (2018.01)

(52) U.S. Cl.
CPC .................................... *G06F 8/443* (2013.01)

(58) Field of Classification Search
None
See application file for complete search history.

(56) References Cited

U.S. PATENT DOCUMENTS

| | | | |
|---|---|---|---|
| 5,396,631 A * | 3/1995 | Hayashi | G06F 8/443 360/51 |
| 5,522,079 A | 5/1996 | Acker et al. | |
| 7,392,513 B2 * | 6/2008 | Long | G06F 8/443 711/159 |
| 11,379,200 B2 * | 7/2022 | Dwars | G06F 8/34 |
| 2005/0155023 A1 * | 7/2005 | Li | G06F 8/443 717/140 |

(Continued)

FOREIGN PATENT DOCUMENTS

| | | | | |
|---|---|---|---|---|
| CN | 108614694 A | * | 10/2018 | G06F 8/443 |
| JP | 2004272826 A | * | 9/2004 | G06F 8/443 |

OTHER PUBLICATIONS

Ramshankar et al., Loop Fusion Amid Complex Control Flow, Conference: Euro-LLVM, May 2015.

(Continued)

*Primary Examiner* — Ryan D. Coyer

(57) ABSTRACT

A method for fusing functions of a software program is provided. The method includes processing an intermediate representation (IR) of the software program and determining one or more function call candidates capable of fusion based on the processed IR. The method further includes determining similarities between the function call candidates and generating a merged function of the function call candidates based on the determined similarities. The method further includes generating at least one interleaved version of the merged function and determining an optimized function version from among the merged function and the at least one interleaved version. The method further includes generating a fused function based on the determined optimized function version. In addition, a device is provided which includes a processor, and non-transitory computer readable memory having stored thereon machine-readable instructions which when executed by the processor configure the device to execute the methods disclosed herein.

16 Claims, 7 Drawing Sheets

(56) References Cited

U.S. PATENT DOCUMENTS

| | | | |
|---|---|---|---|
| 2006/0048111 A1* | 3/2006 | Archambault | G06F 8/443 |
| | | | 717/144 |
| 2010/0023931 A1* | 1/2010 | Cheng | G06F 8/433 |
| | | | 717/156 |
| 2011/0131556 A1 | 6/2011 | Tatsubori | |
| 2011/0238945 A1* | 9/2011 | Ryu | G06F 12/0223 |
| | | | 711/171 |
| 2012/0297383 A1 | 11/2012 | Meisner et al. | |
| 2016/0224324 A1* | 8/2016 | Li | G06F 8/443 |
| 2016/0246580 A1 | 8/2016 | Das Gupta et al. | |
| 2017/0235556 A1* | 8/2017 | Edler Von Koch | G06F 8/4435 |
| | | | 717/159 |
| 2017/0242671 A1 | 8/2017 | Edler Von Koch et al. | |
| 2020/0310768 A1* | 10/2020 | Zhang | G06F 8/43 |
| 2022/0214866 A1* | 7/2022 | Li | G06F 8/443 |

OTHER PUBLICATIONS

Hoflehner, LLVM Performance Improvements and Headroom, Apple, LLVM Developers' Meeting 2015.

Lamzed-Short et al., Towards Kernel Fusion for the Optimisation of Scientific Applications. AWE, 2020.

Qiao et al., "From Loop Fusion to Kernel Fusion: A Domain-Specific Approach to Locality Optimization," 2019 IEEE/ACM International Symposium on Code Generation and Optimization (CGO), pp. 242-253, doi: 10.1109/CGO.2019.8661176, 2019.

Qiao et al., Automatic Kernel Fusion for Image Processing DSLs, In Proceedings of the 21st International Workshop on Software and Compilers for Embedded Systems (Scopes '18), Association for Computing Machinery, New York, NY, USA, 76-85, 2018.

Rocha et al., Function Merging by Sequence Alignment, Washington, DC, USA, CGO 2019.

* cited by examiner

100

102 Process an intermediate representation (IR) of a software program.

104 Determine one or more function call candidates capable of fusion based on the processed IR.

106 Determine similarities between the one or more function call candidates.

108 Generate a merged function of the one or more function call candidates based on the determined similarities.

110 Generate at least one interleaved version of the merged function.

112 Determine an optimized function version from among the merged function and the at least one interleaved version of the merged function.

114 Generate a fused function based on the determined optimized function version.

FIG. 1

METHODS AND DEVICES FOR COMPILER FUNCTION FUSION

CROSS-REFERENCE TO RELATED APPLICATIONS

This is the first application filed for the present disclosure.

FIELD

The present disclosure pertains to the field of computing, and in particular to techniques for compiler function fusion.

BACKGROUND

Computer source code often contains redundancies and inefficiencies. Code is generally subject to further optimization, but it can be complex and time consuming to manually optimize code.

Automatic optimization tools are available but are often limited in their capabilities. These optimization tools may result in relatively high code size overheads and an increase in the time spent compiling the source code. The computer code field is therefore subject to, and would benefit from, further improvements. Accordingly, there is a need for techniques for optimizing computer code, that are not subject to one or more limitations of the prior art.

This background information is provided to reveal information believed by the applicant to be of possible relevance to the present disclosure. No admission is necessarily intended, nor should be construed, that any of the preceding information constitutes prior art against the present disclosure.

SUMMARY

An object of embodiments of the present disclosure is to provide methods and devices for compiler function fusion.

An aspect of the disclosure provides a method for fusing functions of a software program. The method includes processing an intermediate representation (IR) of the software program, wherein IR may refer to code that is used internally by a compiler for the representation of source code. The method further includes determining one or more function call candidates capable of fusion based on the processed IR. The method further includes determining similarities between the one or more function call candidates and generating a merged function of the one or more function call candidates based on the determined similarities. The method further includes generating at least one interleaved version of the merged function and determining an optimized function version from among the merged function and the at least one interleaved version of the merged function. The method further includes generating a fused function based on the determined optimized function version.

In some embodiments the one or more function call candidates are consecutive function calls. In some embodiments determining similarities between the one or more function call candidates includes evaluating strongly connected components (SCCs) of each of the one or more function call candidates in relation to SCCs of others of the one or more function call candidates. In some embodiments evaluating SCCs includes at least one of constructing (or identifying) SCCs, topologically sorting SCCs, and comparing SCCs. In some embodiments generating the at least one interleaved version of the merged function includes at least one of interleaving software program code, moving software program code, and reordering software program code. In some embodiments determining the optimized function version includes determining a benefit estimation of the merged function and the at least one interleaved version of the merged function. In some embodiments determining a benefit estimation includes determining cost models based on predefined heuristics specific to the merged function and the each one of the at least one interleaved version of the merged function. In some embodiments determining the optimized function version includes evaluating the merged function and the at least one interleaved version of the merged function using profile-guided optimization (PGO). In some embodiments the at least one interleaved version includes at least one of a loop fusion optimization, a partial redundancy elimination (PRE) optimization, a simplification of a control-flow graph (CFG) optimization, and another type of optimization. In some embodiments generating a merged function includes appending the body of each of the one or more function call candidates to a new skeleton function.

Advantages offered by embodiments of the present disclosure include the introduction of various optimization opportunities that were previously impossible due to code being separated into different functions. Examples of such opportunities include, but are not limited to, loop fusion, partial redundancy elimination (PRE) and control-flow graph (CFG) simplification. Furthermore, using topologically sorted strongly connected components (SCCs) of each function to evaluate similarities between functions allows for the opportunity to use the SCCs to interleave the code inside a newly generated merged function. Moreover, proposed embodiments introduce less code size and compile time overhead as compared to inlining techniques, wherein inlining (or inline expansion) may be considered as a type of manual compiler optimization which replaces a function call instance with the body of the called function.

Another aspect of the disclosure provides for a device. The device includes a processor, and non-transitory computer readable memory having stored thereon machine readable instructions which when executed by the processor configure the device to execute the methods disclosed herein. For example, upon execution of the instructions by a processor such a device is configured to process an intermediate representation (IR) of a software program and determine one or more function call candidates capable of fusion based on the processed IR. Upon execution of the instructions by a processor such a device is further configured to determine similarities between the one or more function call candidates and generate a merged function of the one or more function call candidates based on the determined similarities. Upon execution of the instructions by a processor such a device is further configured to generate at least one interleaved version of the merged function and determine an optimized function version from among the merged function and the at least one interleaved version of the merged function. In addition, upon execution of the instructions by a processor such a device is further configured to generate a fused function based on the determined optimized function version.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which:

FIG. 1 illustrates a method for fusing functions of a software program, according to embodiments of the present disclosure.

It will be noted that throughout the appended drawings, like features are identified by like reference numerals.

DETAILED DESCRIPTION

Figure 2:
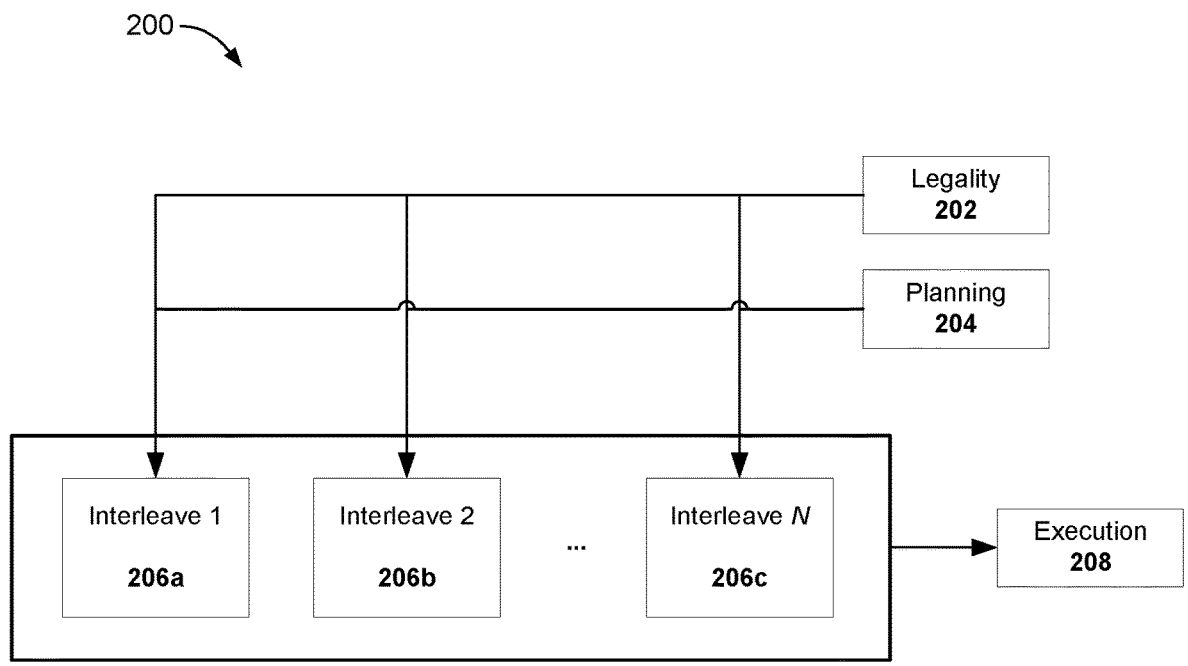
FIG. 2 illustrates a block diagram based on the method of FIG. 1, according to embodiments of the present disclosure.

Embodiments of the present disclosure describe methods for compiler function fusion. In order to identify potential optimization opportunities in spite of code being separated into different methods, patterns such as a single function or a plurality of similar functions being called back-to-back may be identified in an intermediate stage during a compilation step. Based on this information, a new merged function may be created by appending the body of each one of these consecutive functions into an empty skeleton function. The merged function may allow for the opportunity to interleave the code inside of this skeleton function for exposure to or identification of more optimization opportunities that may have been significantly difficult before.

An advantage of embodiments disclosed herein is that the code size overhead introduced through the fusing function methods may be less than inlining in certain cases, wherein inlining (or inline expansion) is a type of manual compiler optimization which replaces a function call instance with the body of the called function. Further, embodiments disclosed herein allow for a reduction in the time spent compiling the source code, as compared to inlining, due to less duplicated code. Moreover, embodiments of the present disclosure propose a method that is able to identify similar functions automatically inside a compiler.

Example software program code resembling C/C++ may be used throughout this disclosure purely as an example application of embodiments of the present disclosure. Those of skill in the art will reasonably appreciate that embodiments of the present disclosure will not be limited to any one particular programming language.

At times, in the source code of written computer programs, similar functions are called back-to-back. Consider the source code in Code Sample 1, which contains two consecutive function calls.

```
void test ( ) {
    int *o1, *d, *f;
    double *o2;
    foo.1 (*d, *f, *o1);
    foo.2 (*d, *f, *o2);
} (1)
```

For instance, assume that the code inside functions foo.1 and foo.2 are as shown in Code Sample 2.

```
void foo.1(const int *in_1, const int* in_2, int* output) {
    int cond;
    evaluate (&cond);
    int s1=sizeof (in_1)/sizeof (in_1 [0]);
    int s2=sizeof (in_2)/sizeof (in_2 [0]);
    if (cond) {
        for (int i=0; i<max (s1, s2); ++i)
            output [i]=(in_1[i] * in_2[i]);
    }
    return;
}
void foo.2(const int* in_1, const int* in_2, double* output) {
    int cond;
    evaluate (&cond);
    int s1=sizeof (in_1)/sizeof (in_1 [0]);
    int s2=sizeof (in_2)/sizeof (in_2 [0]);
    if (cond) {
        for (int i=0; i<max (s1, s2); ++i)
            output [i]=(in_1[i]/in_2[i]);
    }
    return;
} (2)
```

If the loops inside these functions iterate over large array strides over a memory utilization that is too large to fit in the cache, then it can be beneficial to fuse them together to improve the locality of reference. However, as the loops are contained in separate functions, the fusion of these loops is not possible by conventional means.

Some embodiments of the present disclosure propose a method to detect, and in some instances automatically detect, back-to-back function calls that have function fusion opportunities during the link time optimization (LTO) pipeline. The method replaces adjacent function calls with a single call instruction. The single call instruction calls a newly generated merged function that is created by appending the body of each of the detected adjacent called functions into an empty skeleton function.

It will be reasonably understood that the performing of function fusion during LTO is only one example of when function fusion may be performed and has been chosen as an example to describe one implementation in accordance with the present disclosure. For example, and in some embodiments, function fusion may be performed before the LTO pipeline, during the compilation stage or other suitable stage as would be readily understood by a worker skilled in the art.

In addition to the above detection and merged function generation steps, according to embodiments the method may be able to detect possible code reordering opportunities that exist for the generated merged function. Moreover, a reordered version of the merged function may provide further opportunities for further transformations to generate highly optimized code.

Code Sample 3 illustrates the code after a function fusion pass has performed its transformation of the code provided in Code Sample 1.

```
void test (int a) {
    int *o1, *d, *f;
    double *o2;
    foo.1foo.2.fused (*d, *f, *o1, *o2);
} (3)
```

Some embodiments of the present disclosure propose a method for static code analysis and transformation that is added to the optimization pipeline during link-time optimization. FIG. 1 is a flowchart of a method 100 for fusing functions of a software program. The method 100 involves, at step 102, processing an intermediate representation (IR) of the software program. As used herein, IR refers to code that is used internally by a compiler to represent source code. IR may include low-level programming languages, such as LLVM IR. The method 100 further involves, at step 104, determining one or more function call candidates capable of fusion based on the processed IR. The method 100 further involves, at step 106, determining similarities between the one or more function call candidates. The method 100 further involves, at step 108, generating a merged function of the one or more function call candidates based on the determined similarities. The method 100 further involves, at step 110, generating at least one interleaved version of the merged function. In some embodiments generating the at least one interleaved version of the merged function includes at least one of interleaving software program code, moving software program code, and reordering software program code. The method 100 further involves, at step 112, determining an optimized function version from among the merged function and the at least one interleaved version of the merged function. The method 100 further involves, at step 114, generating a fused function based on the determined optimized function version.

It will be readily understood that an optimized function version can be envisioned as a most optimized function, best optimized version or a suitably sufficient optimized version. By use of the term optimized, there is no intent that the optimized version is to be considered as absolute, it merely may be a suitably optimized version or an adequate version for a particular case.

In some embodiments the one or more function call candidates are consecutive function calls. This may include different functions that are similar, or may be a single function that is called repeatedly.

In some embodiments generating a merged function includes appending the body of each of the one or more function call candidates to a new skeleton function. This way, a basic merged function may be generated to serve as a starting point before other operations, such as interleaving, are performed on the merged function. In certain cases, the merged function itself may be the optimized function version.

FIG. 2 is an alternative depiction of the method 100 of FIG. 1, in which the method is depicted as block diagram 200. The block diagram 200 presents the method of FIG. 1 in three broad phases: a legality phase 202, a planning phase 204 and an execution phase 208. The legality phase 202 may be considered to include steps 102, 104 and 106 of FIG. 1. The planning phase 204 may be considered to include steps 108, 110 and 112 of FIG. 1. The execution phase may be considered to include step 114 of FIG. 1. Also depicted in the block diagram 200 are example interleave versions which may be generated at step 110 of FIG. 1. Interleave version 1 206a, interleave version 2 206b and interleave version N 206c represent example interleaved versions of a merged function. It will be reasonably understood that the actual number of interleave versions may vary in any given piece of software code. As such, interleave version N 206c represents a variable number of interleave versions.

Figure 3:
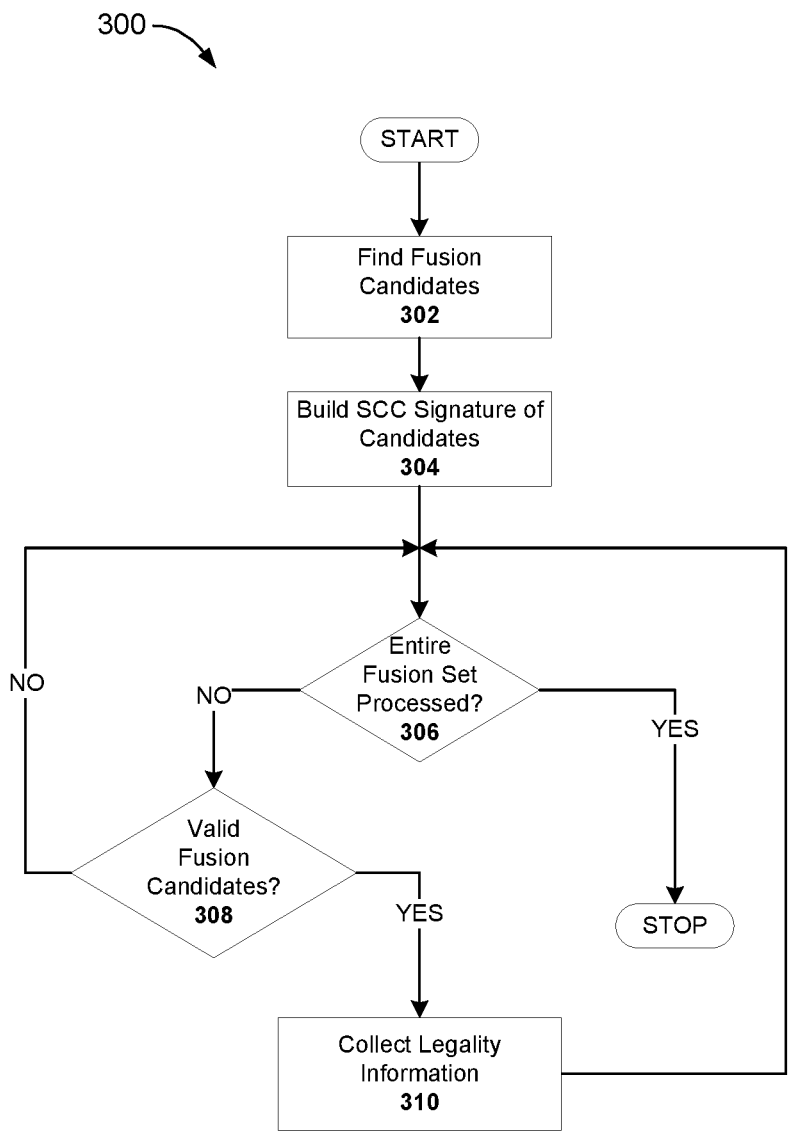
FIG. 3 illustrates a flow chart of a legality phase, according to embodiments of the present disclosure.

FIG. 3 illustrates the legality phase 202 of FIG. 2 in greater detail, by depicting the legality phase 202 as a flow chart 300. The legality phase 202 begins by processing the generated intermediate representation (IR) of the whole program module, which allows the process of finding fusion candidates at step 302. This requires the process to find back-to-back function calls that are safe for fusing together. In this step 302, it should be ensured that fusing the functions maintains the original order of execution of the functions. Next, at step 304, the strongly connected component (SCC) signatures of the fusion candidates are generated from the IR. As used herein, a signature refers to the topological sorting of SCCs from the IR of a function. Therefore, a signature may be considered the topologically sorted SCCs of the function. Generating a signature may also be considered the same as generating a topological ordering of SCCs of the function. Signatures may then be used to determine whether the ordering of SCCs match when comparing functions. For example, the SCCs that correspond to loops should have the same ordering within the topological sorting (i.e., the signature) for the functions being compared. Using Code Sample 2 defined above as an example, the signatures derived from the IR of functions foo.1 and foo.2 will match. The SCC signature information is used to determine if the fusion candidates can pass the criterion for similarity.

In some embodiments determining similarities between the one or more function call candidates includes evaluating the strongly connected components (SCCs) of each of the function call candidates in relation to SCCs of each of the other function call candidates. This evaluation may be determined by use of a directed graph, wherein a directed graph is considered strongly connected if there is a path in each direction between each pair of vertices of the graph. Further, a strongly connected component (SCC) of a directed graph is a subgraph that is strongly connected, and is maximal with this property (i.e., no additional edges or vertices from the main graph can be included in the subgraph without breaking its property of being strongly connected). In order to evaluate all fusion candidates in terms of their similarities, the SCCs of each one of the candidate functions in the fusion sets are generated (or constructed) from the IR, sorted topologically and compared to each other during the legality phase 202. This comparison is performed based on several predefined static criterion.

As an example, a predefined static criterion can be based on similarities that can impact the conditions necessary for a loop fusion pass, which attempts to combine two or more loops into a single loop. For this example, it is desired that every two candidate functions for fusion have the same numbers of SCCs. Second, all SCCs that correspond to loops and all SCCs that contain function calls are detected in each fusion candidate. Then, it is determined whether the SCCs with loops in each candidate match, and whether the SCCs with a function call in each candidate match.

For example, considering functions foo.1 and foo.2 shown in Code Sample 2 above, after generating a signature (i.e. a topological sorting of the SCCs) for each of foo.1 and foo.2, it is determined that both functions possess, for example, five SCCs. Thus, these functions pass the first similarity criteria by having the same number of SCCs. Moving to the next similarity evaluation, it is determined that the SCC, for example, at the third position (e.g. of the ordering) of each of the signatures for foo.1 and foo.2 contain a loop. Therefore, the SCCs corresponding to the loops associated with these functions match. Finally, it is determined that the SCC, for example, at the fifth position (e.g. of the ordering) of each of the signatures for foo.1 and foo.2 contain call instructions. Therefore, the SCCs corresponding to function calls match. Thus, the fusion candidates have all the necessary criterion defined for a similarity evaluation.

During the legality phase 202, with the use of several analyses, the necessary information about the behavior of the code can also be collected in order to be used during the planning phase 204. In some embodiments, such analysis is interprocedural alias analysis, which provides information regarding how memory locations are accessed.

Returning to FIG. 3, at step 306, an iterative process begins to process the entire fusion set. Step 306 checks whether the entire fusion set has been processed. If it has not been completely processed, then, at step 308, it is checked if the unprocessed candidates are valid fusion candidates. If these unprocessed candidates are valid fusion candidates then, at step 310, the fusion candidates are sent to a set of interprocedural analyses pass in order to collect the necessary (e.g. legality) information related to the behavior of these further fusion candidates. The legality information is collected and sent back for use in step 306. If the fusion candidates are not valid fusion candidates, then that information is also returned to step 306. Once all fusion sets have been processed, the iterative process is completed.

Figure 4:
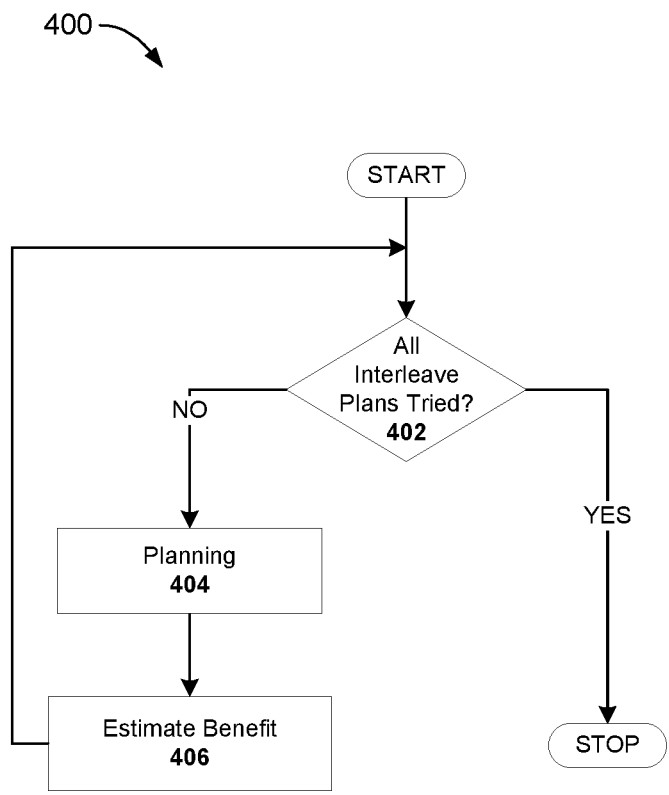
FIG. 4 illustrates a flow chart of a planning phase, according to embodiments of the present disclosure.

FIG. 4 illustrates the planning phase 204 of FIG. 2 in greater detail, by depicting the planning phase 204 as a flow chart 400. At this point a merged function may be generated using valid function call candidates. The planning phase 204 will interleave, move, and reorder the code around inside of the merged function using the SCCs of the fuse-able functions that were constructed during the legality phase 202. This operation can improve the chances that subsequent transformation passes can effectively transform the code and generate an improved code or optimized code. Depending on the number of predefined planning phase iterations, a number of interleaved versions of the merged function can be generated. As an example, assuming that two interleave plans have been defined, which will reorder the code with the purpose of opening more opportunities for partial redundancy elimination (PRE) and loop fusion. This can result in two interleaved versions of the merged function which are different in terms of the order of the code associated with each of them. The flow chart 400 begins, at step 402, by checking if each one of the interleaved versions (e.g. plans) have been attempted. If there are interleaved versions (e.g. plans) that have not been attempted then, at step 404, the process begins to analyze each plan. As part of the planning step 404, and in some embodiments, the process estimates the benefit of the particular interleaved version, at step 406. In some embodiments determining a benefit estimation includes determining (e.g., calculating) cost models based on predefined heuristics specific to the each one of the at least one interleaved version.

For example, this can be considered to be an evaluation of a cost model used to estimate the benefits of interleaved functions for the purpose of loop fusion opportunities. In this case, the number of the loops that can be fused together after each interleaved version can be defined by an appropriate heuristic used for picking the best interleaving plan. Another possible heuristic for this evaluation can be defined as the number of instructions that will be removed in each interleaved version of the merged function. One or more of these heuristics may be used to pick the best option of interleaved functions of all possibilities in terms of achieving highest PRE opportunities.

The information from the benefit estimation step 406 is then returned for use at step 402 in order to compare this information to information gathered from other plans. Once all interleaved plans have been attempted (e.g. step 402), the planning process is completed.

In some embodiments the at least one interleaved version includes at least one of a loop fusion optimization, a partial redundancy elimination (PRE) optimization, a simplification of a control-flow graph (CFG) optimization, and another type of optimization. It will be reasonably understood that this list of optimizations is not an exhaustive list, and that other such optimizations may also be applied. It will also be understood that in some cases the code of the original merged function may already be in an optimized format, in which case no further optimizations may be needed or selected.

Following the planning phase 204, the execution phase 208 will use the estimated benefits calculated by the planning phase 204 in order to pick the best version of the interleaved code and use one selected from all of the generated merged functions to rewrite back-to-back function calls. The optimized function version (which in some instances may be the original merged function) may then be used for execution and other further optimization.

Figure 5:
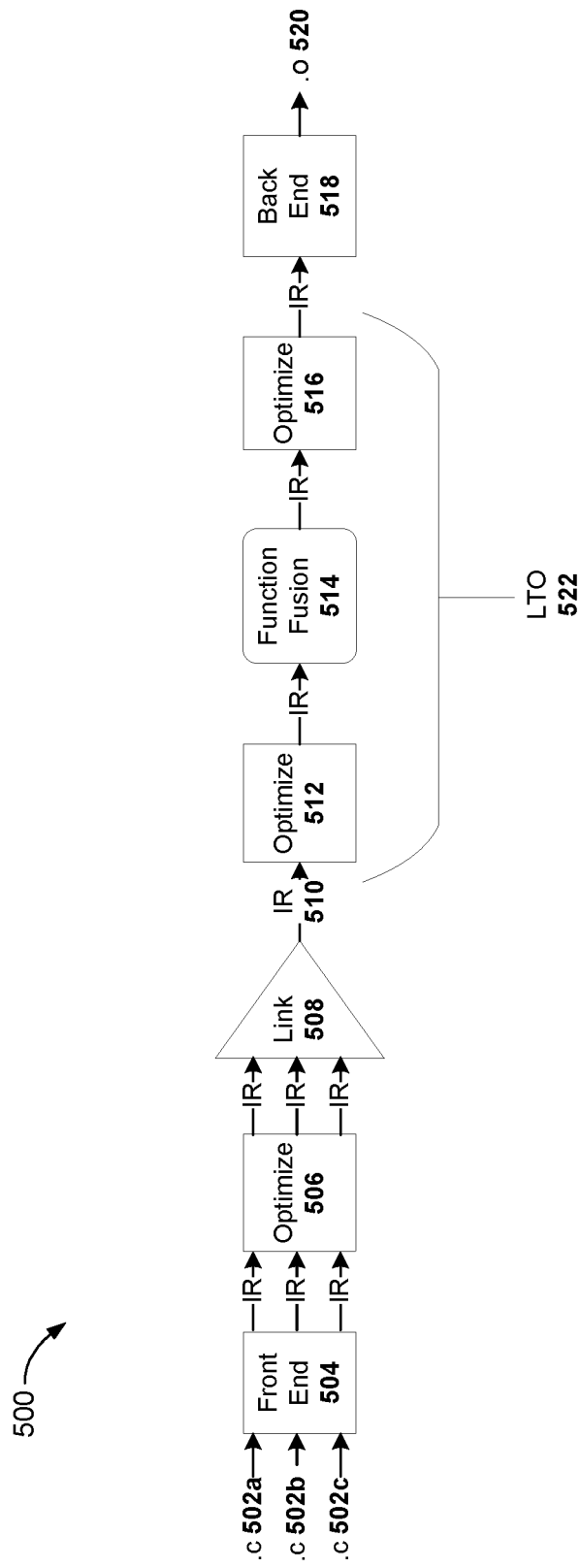
FIG. 5 illustrates an example compilation process, according to embodiments of the present disclosure.

FIG. 5 depicts an overview of the complete compilation process 500, illustrating the flow of compilation from source code to binary, with several phases of intermediate representation (IR) in between different stages. The process 500 begins with the source code of a program (depicted as .c files 502*a*, 502*b* and 502*c*) being translated into IR by a front end 504. Then, early code optimizations are performed on each single unit at step 506, and all units are linked together at step 508 to generate a single IR module 510 representing the whole program. Next, more global optimization passes at step 512 can further optimize the code that is going to be feed into the proposed function fusion stage 514. Function fusion stage 514 transforms the code according to embodiments of the present disclosure. Finally, more link-time optimization passes 516 can be performed on the IR in order to attempt to produce a highly optimized IR for use by back end 518 for object code generation (.o file 520). Steps 512, 514 and 516 include the link-time optimization stage 522.

As mentioned previously, it will be understood that performing function fusion during LTO is not to be taken as a limiting example of when function fusion may be performed. For example, function fusion may be performed during the compilation stage, such as at step 506, or other suitable stage as would be readily understood by a worker skilled in the art.

This embodiment of the present disclosure will allow for various optimization opportunities that were unachievable before function fusion because the pattern enabling an optimization opportunity could not be detected by transformation passes in the pipeline due to the code being separated into different functions. Examples of such opportunities include, but are not limited to, loop fusion, partial redundancy elimination (PRE) and control-flow graph (CFG) simplification.

Using topologically sorted SCCs of each one of the functions to evaluate the similarities of functions can also provide an opportunity to use the SCCs to interleave the code inside the generated merged function.

The proposed method also reduces the negative impacts that inlining functions might cause, after inlining them into caller. The method according to embodiments, reuses the same generated fused version of the function if the same sequence of the back-to-back function calls are repeated across the function. This method is in contrast to repeatedly inlining the functions at these locations as code level modularity is preserved. In other words, embodiments of the present disclosure can introduce a reduced code size and compile time overhead when compared to inlining.

In some embodiments determining an improved interleaved version includes evaluating the at least one interleaved version using profile-guided optimization (PGO). While embodiments disclosed thus far target ahead of time (AOT) compilers, according to embodiments the method may also be used in just-in-time (JIT) and PGO guided compilers.

Figure 6:
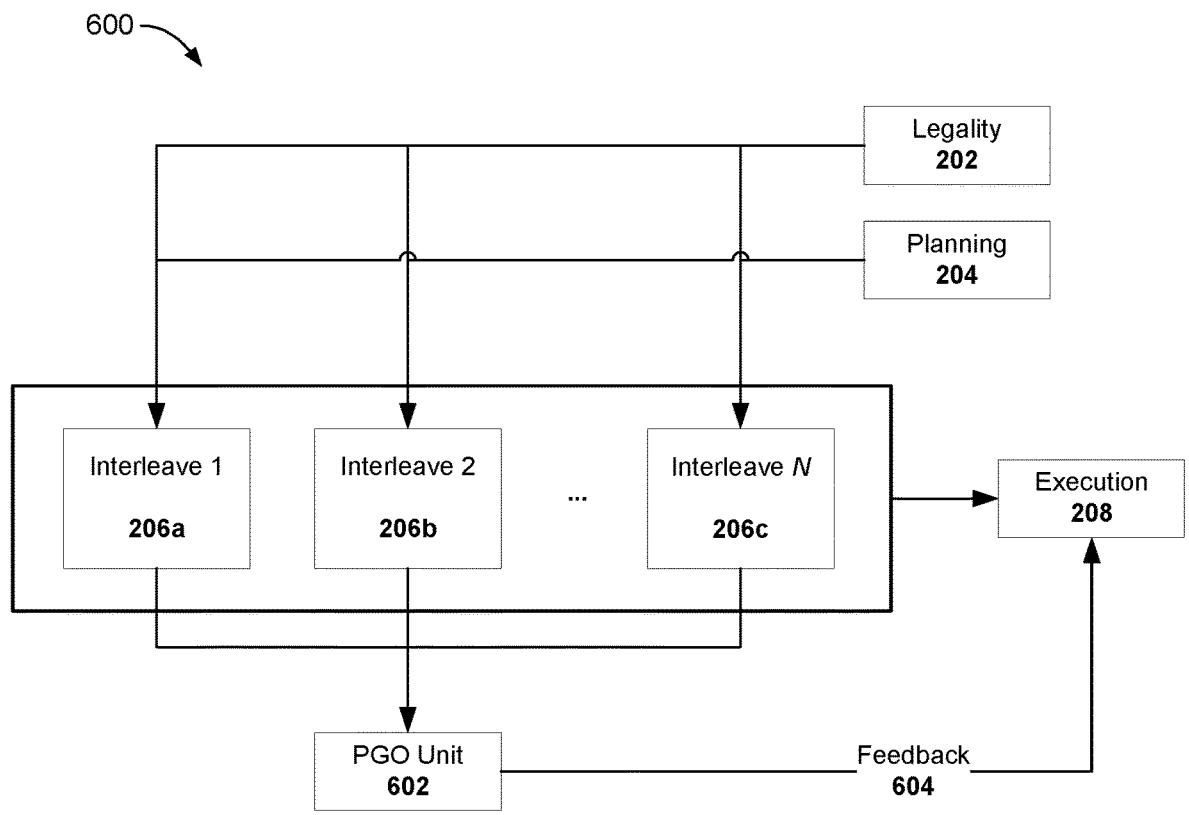
FIG. 6 illustrates an alternative block diagram at least in part based on FIG. 2, according to embodiments of the present disclosure.

FIG. 6 depicts a block diagram 600, very similar to that of FIG. 2, of framework where different interleaved versions 206a, 206b and 206c of the merged function are all chosen to replace the consecutive function call by passing them through PGO unit 602. Feedback 604 from the PGO unit 602 is then provided to the execution phase 208 to pick the best interleaved plan with the highest benefit. Often it is not possible for a compiler to correctly analyze a program and determine what it will do statically without knowledge of execution time. In such cases, using profiling in order to select an optimized function version may be preferable when compared to the heuristics-based method of estimating benefits.

An advantage of a JIT/PGO guided compiler is that it may generate code specific to the currently running CPU at runtime. This is in contrast to an AOT compiler that has to optimize code for a generalized subset of architectures. Such information may be helpful during the planning and execution of the method of the instant disclosure.

Figure 7:
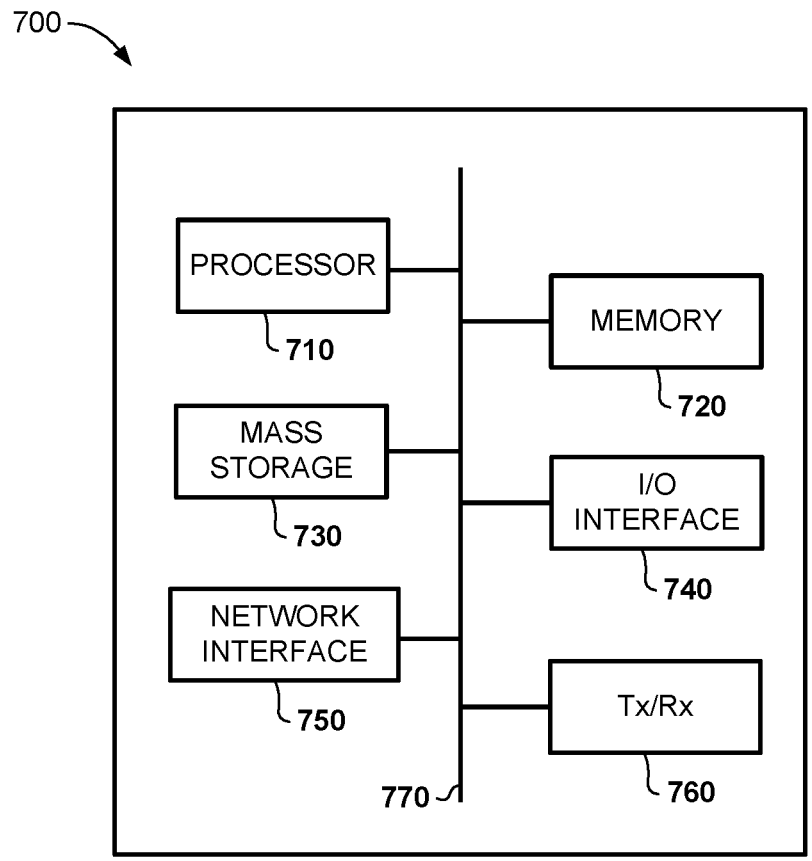
FIG. 7 illustrates a block diagram of an example electronic device used for implementing methods disclosed herein, according to embodiments of the present disclosure.

FIG. 7 is a schematic diagram of an electronic device 700, such as a computing device or system, that may perform any or all of the steps of the above methods and features described herein, according to different embodiments of the present disclosure.

As shown, the device includes a processor 710, memory 720, non-transitory mass storage 730, I/O interface 740, network interface 750, and a transceiver 760, all of which are communicatively coupled via bi-directional bus 770. According to certain embodiments, any or all of the depicted elements may be utilized, or only a subset of the elements. Further, the device 700 may contain multiple instances of certain elements, such as multiple processors, memories, or transceivers. Also, elements of the hardware device may be directly coupled to other elements without the bi-directional bus.

The memory 720 may include any type of non-transitory or non-transient memory such as static random access memory (SRAM), dynamic random access memory (DRAM), synchronous DRAM (SDRAM), read-only memory (ROM), any combination of such, or the like. The mass storage element 730 may include any type of non-transitory storage device, such as a solid state drive, hard disk drive, a magnetic disk drive, an optical disk drive, USB drive, or any computer program product configured to store data and machine executable program code. According to certain embodiments, the memory 720 or mass storage 730 may have recorded thereon instructions (e.g. machine readable instructions) executable by the processor 710 for performing any of the aforementioned method steps described above.

Acts associated with the methods described herein can be implemented as coded instructions in a computer program product. In other words, the computer program product is a computer-readable medium upon which software code is recorded to execute the methods when the computer program product is loaded into memory and executed by the processor of a computing device.

Acts associated with the methods described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the processor of a computing device.

Further, each step of the methods may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

We claim:

1. A method, in an electronic device, for fusing functions of a software program, the method comprising:
    processing an intermediate representation (IR) of the software program;
    determining one or more function call candidates capable of fusion based on the processed IR;
    determining similarities between the one or more function call candidates;
    generating a merged function of the one or more function call candidates based on the determined similarities;
    generating at least one interleaved version of the merged function;
    selecting, based in part on a benefit estimation of the merged function and the at least one interleaved version of the merged function, an optimized function version from the merged function and the at least one interleaved version of the merged function; and
    generating a fused function based on the selected optimized function version,
    wherein the selecting comprises determining the benefit estimation by determining cost models based on predefined heuristics specific to the merged function and each one of the at least one interleaved version of the merged function.

2. The method of claim 1 wherein the one or more function call candidates are consecutive function calls.

3. The method of claim 1 wherein determining similarities between the one or more function call candidates includes evaluating strongly connected components (SCCs) of each of the one or more function call candidates in relation to SCCs of others of the one or more function call candidates; and
    wherein evaluating SCCs includes at least one of:
        constructing SCCs;
        topologically sorting SCCs; and
        comparing SCCs.

4. The method of claim 1 wherein generating the at least one interleaved version of the merged function includes at least one of:
- interleaving software program code;
- moving software program code; and
- reordering software program code.

5. The method of claim 1 wherein selecting the optimized function version includes evaluating the merged function and the at least one interleaved version of the merged function using profile-guided optimization (PGO).

6. The method of claim 1 wherein the at least one interleaved version includes at least one of:
- a loop fusion optimization;
- a partial redundancy elimination (PRE) optimization;
- a simplification of a control-flow graph (CFG) optimization; and
- another type of optimization.

7. The method of claim 1 wherein generating a merged function includes appending the body of each of the one or more function call candidates to a new skeleton function.

8. A device comprising a processor, and a non-transitory computer readable memory having stored thereon machine readable instructions which when executed by the processor configure the device to:
- process an intermediate representation (IR) of a software program;
- determine one or more function call candidates capable of fusion based on the processed IR;
- determine similarities between the one or more function call candidates;
- generate a merged function of the one or more function call candidates based on the determined similarities;
- generate at least one interleaved version of the merged function;
- select, based in part on a benefit estimation of the merged function and the at least one interleaved version of the merged function, an optimized function version from among the merged function and the at least one interleaved version of the merged function; and
- generate a fused function based on the selected optimized function version,
- wherein the benefit estimation is determined by determining cost models based on predefined heuristics specific to the merged function and each one of the at least one interleaved version of the merged function.

9. The device of claim 8 wherein the one or more function call candidates are consecutive function calls.

10. The device of claim 8 wherein to determine similarities between the one or more function call candidates includes to evaluate strongly connected components (SCCs) of each of the one or more function call candidates in relation to SCCs of others of the one or more function call candidates; and
wherein to evaluate SCCs includes at least one of:
- constructing SCCs;
- topologically sorting SCCs; and
- comparing SCCs.

11. The device of claim 8 wherein to generate the at least one interleaved version of the merged function includes at least one of:
- to interleave software program code;
- to move software program code; and
- to reorder software program code.

12. The device of claim 8 wherein to select the optimized function version includes to evaluate the merged function and the at least one interleaved version of the merged function using profile-guided optimization (PGO).

13. The device of claim 8 wherein the at least one interleaved version includes at least one of:
- a loop fusion optimization;
- a partial redundancy elimination (PRE) optimization;
- a simplification of a control-flow graph (CFG) optimization; and
- another type of optimization.

14. The device of claim 8 wherein to generate a merged function includes to append the body of each of the one or more function call candidates to a new skeleton function.

15. The method of claim 1, further comprising determining a cost model for each of the merged function and the at least one interleaved version of the merged function, wherein the cost model is determined after the at least one interleaved version of the merged function has been generated.

16. The method of claim 15, wherein selecting the optimized function version comprises selecting based on the cost model for each of the merged function and the at least one interleaved version of the merged function.

* * * * *